(12) United States Patent
Sugino

(10) Patent No.: US 9,205,502 B2
(45) Date of Patent: Dec. 8, 2015

(54) RECIPROCATING SAW

(71) Applicant: MAKITA CORPORATION, Anjo-shi, Aichi (JP)

(72) Inventor: Yudai Sugino, Anjo (JP)

(73) Assignee: MAKITA CORPORATION, Anjo (JP)

( * ) Notice: Subject to any disclaimer, the term of this patent is extended or adjusted under 35 U.S.C. 154(b) by 280 days.

(21) Appl. No.: 13/926,327

(22) Filed: Jun. 25, 2013

(65) Prior Publication Data

US 2014/0053420 A1    Feb. 27, 2014

(30) Foreign Application Priority Data

Aug. 22, 2012  (JP) ................................ 2012-183531

(51) Int. Cl.
| | |
|---|---|
| *B23D 49/10* | (2006.01) |
| *B23D 51/08* | (2006.01) |
| *B23D 51/10* | (2006.01) |
| *B23D 49/16* | (2006.01) |

(52) U.S. Cl.
CPC ............... *B23D 49/10* (2013.01); *B23D 49/16* (2013.01); *B23D 51/08* (2013.01); *B23D 51/10* (2013.01)

(58) Field of Classification Search
CPC ........ B23D 49/10; B23D 51/08; B23D 49/16; B23D 51/10
USPC ............................................................. 30/392
See application file for complete search history.

(56) References Cited

U.S. PATENT DOCUMENTS

| | | | | | |
|---|---|---|---|---|---|
| 1,851,843 | A | * | 3/1932 | Inman ................... | E21B 17/046 |
| | | | | | 279/77 |
| 3,727,929 | A | * | 4/1973 | Fink .................. | B23B 31/16066 |
| | | | | | 279/110 |
| 5,322,302 | A | * | 6/1994 | Quirijnen ......................... | 279/22 |
| 5,443,276 | A | * | 8/1995 | Nasser et al. ..................... | 279/77 |
| 5,487,221 | A | * | 1/1996 | Oda et al. ........................ | 30/392 |
| 5,664,792 | A | * | 9/1997 | Tseng .............................. | 279/77 |
| 5,775,999 | A | * | 7/1998 | Hansson et al. ................ | 464/25 |
| 5,810,367 | A | * | 9/1998 | Holzer et al. ................. | 279/102 |
| 5,848,474 | A | * | 12/1998 | Fortney et al. ................. | 30/392 |
| 6,209,208 | B1 | * | 4/2001 | Marinkovich et al. .......... | 30/392 |
| 6,638,290 | B2 | * | 10/2003 | Pascaloff et al. ............. | 606/177 |
| 6,725,548 | B1 | * | 4/2004 | Kramer et al. .................. | 30/392 |
| 6,735,876 | B2 | * | 5/2004 | Hirabayashi .................... | 30/392 |
| 6,848,186 | B1 | * | 2/2005 | Chen et al. ...................... | 30/392 |
| 6,851,194 | B1 | * | 2/2005 | Chen et al. ...................... | 30/392 |
| 6,854,187 | B2 | * | 2/2005 | Huan .............................. | 30/392 |
| 7,210,232 | B2 | * | 5/2007 | Guo ................................ | 30/392 |

(Continued)

FOREIGN PATENT DOCUMENTS

| | | |
|---|---|---|
| GB | 2 336 805 A | 11/1999 |
| JP | A-08-071842 | 3/1996 |
| JP | A-2002-370123 | 12/2002 |

OTHER PUBLICATIONS

European Search Report issued in Application No. 13174230.6; Dated Aug. 29, 2013.

*Primary Examiner* — Sean Michalski
(74) *Attorney, Agent, or Firm* — Oliff PLC

(57) ABSTRACT

In a reciprocating saw, a slider that is reciprocated by a motor protrudes forward beyond a housing accommodating the motor. A blade that cuts a workpiece can be fixed to a joining portion provided at a tip end of the slider. A protector made of an elastic material is attached to the joining portion. The protector is provided with a contact portion capable of contacting the blade fixed to the joining portion.

6 Claims, 4 Drawing Sheets

(56) References Cited

U.S. PATENT DOCUMENTS

| | | |
|---|---|---|
| 7,818,887 B2 * | 10/2010 | Saegesser et al. ............... 30/392 |
| 2004/0251642 A1 * | 12/2004 | Shuhua ........................... 279/96 |
| 2005/0039340 A1 * | 2/2005 | Bigden et al. ................... 30/392 |
| 2005/0058890 A1 * | 3/2005 | Brazell et al. ................... 429/99 |
| 2005/0132584 A1 * | 6/2005 | Cornwell et al. ............... 30/517 |
| 2006/0174495 A1 * | 8/2006 | Jumior ........................... 30/339 |
| 2007/0074408 A1 * | 4/2007 | Zhang ............................. 30/392 |
| 2008/0289198 A1 * | 11/2008 | Kaiser et al. .................... 30/514 |
| 2009/0277022 A1 * | 11/2009 | Limberg et al. ................. 30/392 |
| 2010/0000100 A1 * | 1/2010 | Saegesser ....................... 30/392 |
| 2010/0154231 A1 * | 6/2010 | Doumani ........................ 30/392 |
| 2010/0229407 A1 * | 9/2010 | Rakaczki ........................ 30/392 |
| 2015/0033565 A1 * | 2/2015 | Wang .............................. 30/392 |
| 2015/0059192 A1 * | 3/2015 | Fragapane ...................... 30/392 |

\* cited by examiner

RECIPROCATING SAW

BACKGROUND OF THE INVENTION

This application claims the benefit of Japanese Patent Application Number 2012-183531 filed on Aug. 22, 2012, the entirety of which is incorporated by reference.

TECHNICAL FIELD

The present invention relates to reciprocating saws in which a blade that cuts a workpiece can be mounted on a slider that is reciprocated by a motor.

BACKGROUND ART

For example, Japanese Patent Application Publication No. 2002-370123 (JP 2002-370123 A) discloses a reciprocating saw that prevents resonance between vibration of a slider that is reciprocated by a motor and vibration of a blade that is mounted on a tip end of the slider to cut a workpiece. The reciprocating saw of JP 2002-370123 A has a vibration reducing member attached to a tip end portion of the slider. The vibration reducing member has a steel ball protruding beyond a tip end of a holding portion having an externally threaded portion so that the steel ball can roll. By rotating the holding portion to change the amount by which the vibration reducing member is screwed in with respect to the slider, this reciprocating saw can be switched between the state where the steel ball contacts a side surface of the blade and the state where the steel ball does not contact the side surface of the blade.

According to the reciprocating saw of JP 2002-370123 A, in the case where vibration of the reciprocating slider resonates with vibration of the blade, the natural frequency of the blade is changed by causing the steel ball to contact or not to contact the side surface of the blade. Resonance between vibration of the blade and vibration of the reciprocating slider can thus be prevented. This can suppress deflection of the blade in the thickness direction thereof, and can improve workability in the operation of cutting the workpiece with the blade.

However, in order to prevent resonance between vibration of the blade and vibration of the reciprocating slider in the reciprocating saw of JP 2002-370123 A, an operation of rotating the holding portion including the steel ball is required to change the natural frequency of the blade. Since some operators find it troublesome to perform such an operation of rotating the holding portion, a simple method for preventing such resonance has been desired.

SUMMARY OF THE INVENTION

In view of the above situation, it is an object of the present invention to provide a reciprocating saw capable of preventing resonance between vibration of a blade and vibration of a reciprocating slider by a simple method.

A reciprocating saw according to a first aspect of the present invention includes a housing, a motor, a slider, a blade, a protector and a contact portion. The motor is accommodated in the housing. The slider has a joining portion at its tip end, protrudes forward beyond the housing, and is driven by the motor so that the slider reciprocates. The blade is capable of being fixed to the joining portion to cut a workpiece. The protector is made of an elastic material and is attached to the joining portion. The contact portion is provided on the protector and is capable of contacting the blade fixed to the joining portion.

According to a second aspect of the present invention, in the first aspect, the contact portion is provided on the protector so that the contact portion can contact both sides of the blade.

According to a third aspect of the present invention, in the first aspect, the contact portion contacts the blade when the blade is fixed to the joining portion, and the contact portion does not contact the blade when the blade is not fixed to the joining portion.

In the reciprocating saw according to the first aspect of the present invention, the natural frequency of the blade can be changed by merely bringing the contact portion into contact with the blade. The frequency of the blade can thus be made different from that of the reciprocating slider. Accordingly, resonance between vibration of the blade and vibration of the reciprocating slider can be prevented by a simple method of bringing the contact portion into contact with the blade.

According to the second aspect of the present invention, the difference between the natural frequency of the blade with which the contact portion is in contact and the frequency of the reciprocating slider can be increased. Thus, resonance between vibration of the blade and vibration of the reciprocating slider can be effectively prevented.

According to the third aspect of the present invention, when the blade is fixed to the joining portion, the contact portion contacts the blade, and thus the natural frequency of the blade can be changed. When the blade is not fixed to the joining portion, the contact portion does not contact the blade, and does not hinder the operation of removing the blade from the joining portion.

DETAILED DESCRIPTION OF THE EMBODIMENTS

Figure 1:
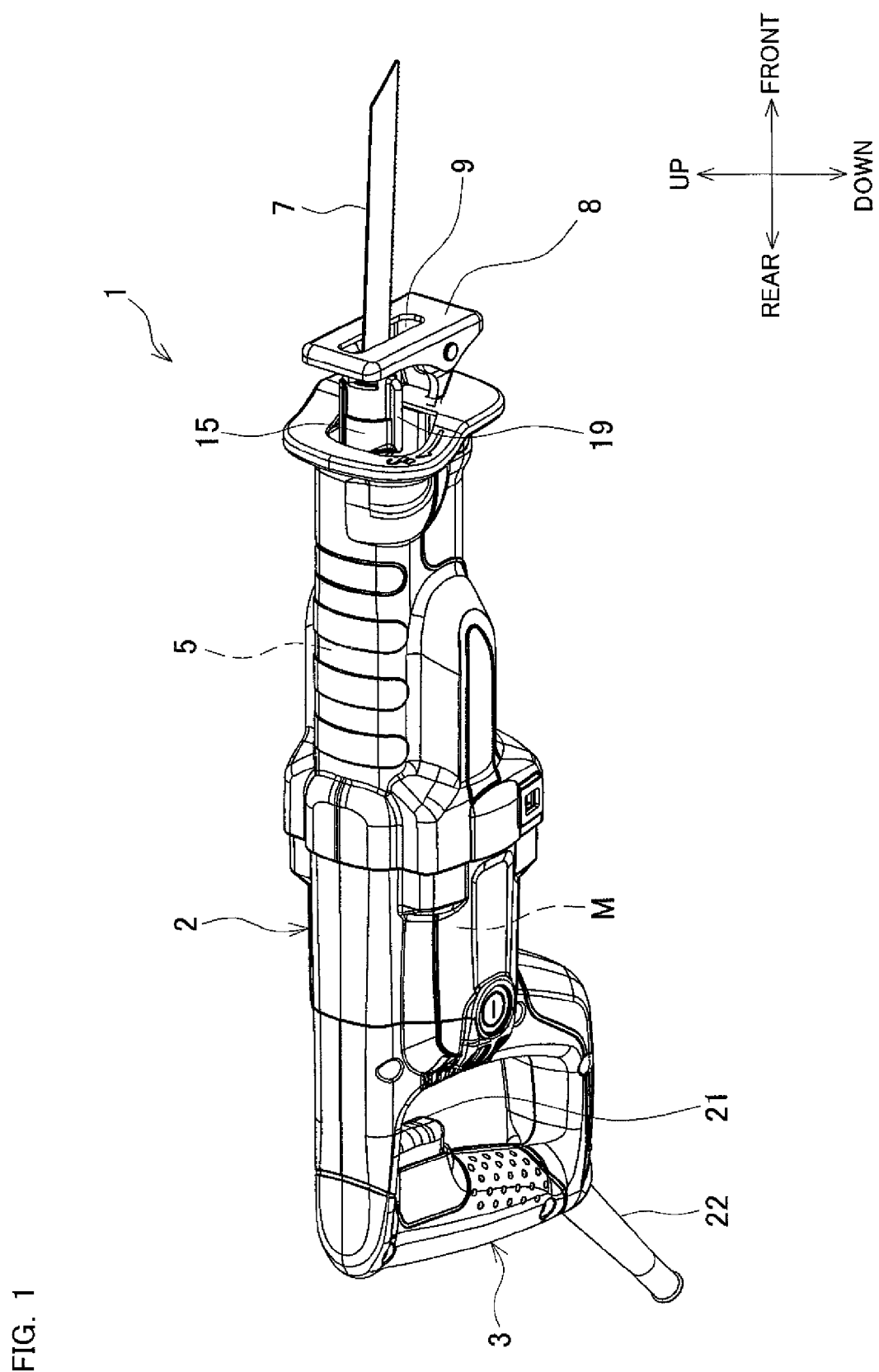
FIG. 1 is a perspective view of a reciprocating saw accommodating a slider to which a protector capable of contacting a blade is attached according to an embodiment of the present invention.

An embodiment of the present invention will be described with reference to FIGS. 1 to 4. As shown in FIG. 1, an alternating current (AC)-driven reciprocating saw 1 includes a housing 2. The housing 2 extends in the longitudinal direction of the reciprocating saw 1 (the lateral direction in FIG. 1), and a handle 3 is provided at a rear end of the housing 2.

The housing 2 accommodates a motor M in a portion near its center in the longitudinal direction. The housing 2 holds a cylindrical bar-shaped slider 5 shown in FIG. 2 in its front portion so that the slider 5 moves in the longitudinal direction. A tip end of the slider 5 protrudes forward of the housing 2 beyond a front end of the housing 2. A linear blade 7 shown in FIG. 1 is mounted on a tool holder 6 (see FIGS. 2 to 4), which is provided at the tip end of the slider 5, in the axial direction of the slider 5 (the lateral direction of FIGS. 1 and 2). A guide shoe 8 (see FIG. 1) is detachably attached to a front end face of the housing 2 so as to extend perpendicularly to the housing 2. The guide shoe 8 has a through hole 9 (see FIG. 1) extending therethrough in the longitudinal direction of the guide shoe 8 (the lateral direction in FIG. 1), so that the blade 7 extends through the guide shoe 8 via the through hole 9. The housing 2 also accommodates a reciprocating mechanism (not shown) in its front portion. The reciprocating mechanism converts rotation of the motor M to a liner reciprocating movement in the axial direction of the slider 5. The tool holder 6 is an example of the joining portion of the present invention.

Figure 2:
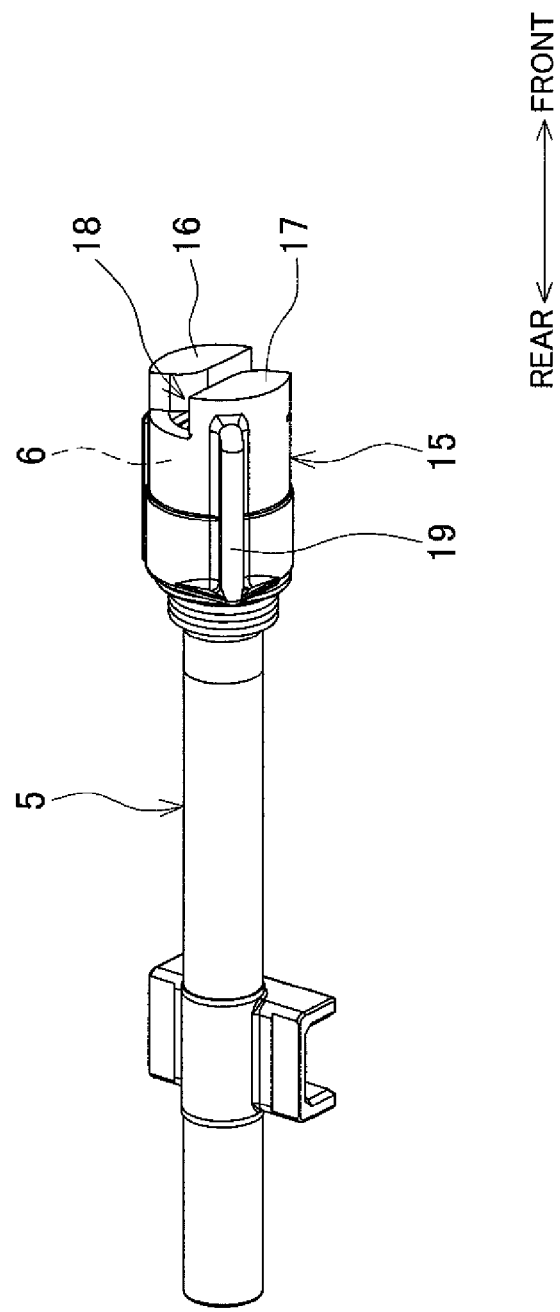
FIG. 2 is a perspective view of the slider.
Figure 3:
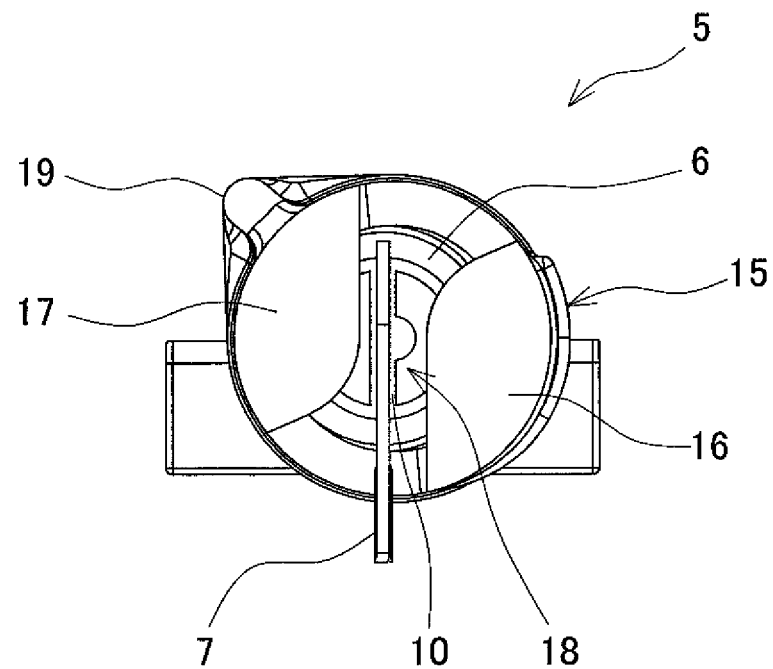
FIG. 3 is a front view of the slider with neither a first protruding portion nor a second protruding portion on a protector being in contact with the blade.
Figure 4:
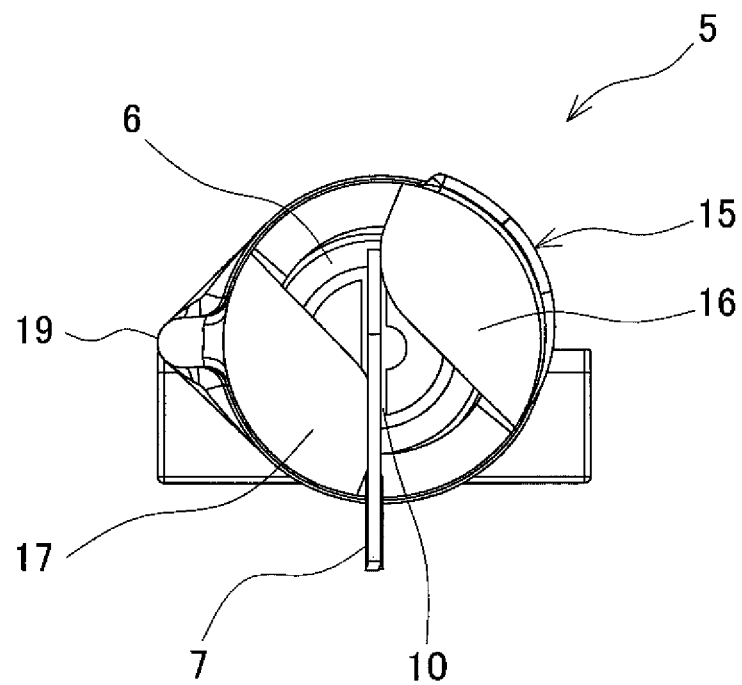
FIG. 4 is a front view of the slider with both the first protruding portion and the second protruding portion being in contact with the blade.

The tool holder 6 shown in FIGS. 2 to 4 is configured in a manner similar to that of a known blade attachment device disclosed in Japanese Patent Application Publication No. 2002-28819 (JP 2002-28819 A). Like the known blade attachment device, in the tool holder 6, a rear end of the blade 7 can be inserted into a slit 10 formed in the axial center of the tool holder 6 shown in FIG. 3 after rotating an operation sleeve to the unclamp side against the biasing force of a torsional spring. Then, when the operation sleeve is rotated to the clamp side with the biasing force of the torsional spring as shown in FIG. 4, a clamp member protruding into the slit 10 is pressed against the blade 7, whereby the blade 7 is retained and fixed in the slit 10. If the operation sleeve is rotated to the unclamp side as shown in FIG. 3, the clamp member moves in a direction away from the slit 10, and a release member for ejecting the blade 7 from the slit 10 protrudes into the slit 10. Thus, the blade 7 is unfixed from the slit 10, so that the blade 7 can be removed from the slit 10.

As shown in FIGS. 2 to 4, a protector 15 is attached to the tool holder 6. This protector 15 is used to reduce the impact that is exerted on the tool holder 6 if the tool holder 6 strikes on a workpiece by accident when the guide shoe 8 is detached from the housing 2 to cut the workpiece. The protector 15 is a cylindrical sleeve body made of rubber, and substantially entirely covers the tool holder 6. The protector 15 can be attached to the tool holder 6 from the front with the blade 7 not being mounted on the tool holder 6. Further, the protector 15 can be detached from the tool holder 6 as desired with the blade 7 not being mounted on the tool holder 6. As shown in FIGS. 1 to 4, the protector 15 has an operation piece 19 on its outer peripheral surface. The operation piece 19 protrudes outward and extends in the longitudinal direction of the protector 15 (the lateral direction of FIGS. 1 and 2). The operator can rotate the operation sleeve against the biasing force of the torsional spring by applying a pressing force to the operation piece 19. Rubber is an example of the elastic material of the present invention.

As shown in FIG. 2, a first protruding portion 16 and a second protruding portion 17 are provided on a front end face of the protector 15 so as to protrude forward of the protector 15. As shown in FIG. 3, the first protruding portion 16 extends from a lower right region toward an upper right region of the front end face of the protector 15, and has a generally fan shape spreading from the center side toward the outer peripheral side of the front end face of the protector 15. As shown in FIG. 3, the second protruding portion 17 extends from an upper left region toward a lower left region of the front end face of the protector 15, and has a generally fan shape spreading from the center side toward the outer peripheral side of the front end face of the protector 15. In this example, the first protruding portion 16 and the second protruding portion 17 are made of rubber, and are molded integrally with the protector 15. The blade 7 is inserted into the slit 10 through space 18 between the first protruding portion 16 and the second protruding portion 17. As shown in FIG. 3, the blade 7 does not contact the first and second protruding portions 16, 17 when inserting the rear end of the blade 7 into the slit 10. The first and second protruding portions 16, 17 therefore do not hinder the operation of inserting the rear end of the blade 7 into the slit 10. The blade 7 also does not contact the first and second protruding portions 16, 17 when the blade 7 shown in FIG. 3 is unfixed from the slit 10 to remove the blade 7 from the slit 10. The first and second protruding portions 16, 17 therefore do not hinder the operation of removing the blade 7 from the slit 10.

As shown in FIG. 4, when retaining and fixing the blade 7 in the slit 10, the operator rotates the operation sleeve and the protector 15 to the clamp side with the pressing force that is applied to the operation piece 19. As a result, as shown in FIG. 4, the vertex portion of the first protruding portion 16 moved to the clamp side is elastically deformed to contact the upper side of the right side surface of the blade 7, and the vertex portion of the second protruding portion 17 moved to the clamp side is elastically deformed to contact the lower side of the left side surface of the blade 7. In the present embodiment, the protruding portions 16, 17 can thus be brought into contact with the both sides of the blade 7 retained and fixed in the slit 10, at separate positions in the vertical direction of the blade 7. The first protruding portion 16 and the second protruding portion 17 are an example of the contact portion of the present invention.

As shown in FIG. 1, the handle 3 has a generally U-shape as viewed from the side. The handle 3 accommodates a switch (not shown) having a trigger 21. The trigger 21 is exposed to the outside of the handle 3 from an opening of the handle 3, and can be pressed into the handle 3. A power cord 22 electrically connected to the switch is attached to the handle 3. If the switch is turned on by pressing the trigger 21 into the handle 3, power is supplied from an external power source to the motor M through the power cord 22.

Operation of the reciprocating saw 1 of the present embodiment will be described. As shown in FIG. 4, after the blade 7 is retained and fixed in the slit 10, the trigger 21 is pressed into the handle 3 to supply power to the motor M. The motor M is thus rotated to operate the reciprocating mechanism. Thus, the slider 5 together with the blade 7 reciprocates in the axial direction of the slider 5 with both the first protruding portion 16 and the second protruding portion 17 being in contact with the right and left side surfaces of the blade 7, respectively, so that the workpiece is cut. In the case where the first and second protruding portions 16, 17 contact the right and left side surfaces of the blade 7 as in the present embodiment, the natural frequency of the blade 7 can be made different from that of the slider 5 reciprocating with the blade 7 mounted thereon. This can prevent resonance between vibration of the blade 7 and vibration of the reciprocating slider 5. This suppresses deflection of the blade 7 in the thickness direction thereof (the lateral direction), and can improve workability in the operation of cutting the workpiece with the blade 7.

In particular, in the case where the first and second protruding portions 16, 17 are brought into contact with the right and left side surfaces of the blade 7 as in the present embodiment, the first and second protruding portions 16, 17 can suppress vibration of the blade 7 in the lateral direction. This can increase the difference between the natural frequency of the blade 7 with which the first and second protruding portions 16, 17 are in contact and the frequency of the reciprocating slider 5. As a result, resonance between vibration of the blade 7 and vibration of the reciprocating slider 5 can be effectively prevented. Moreover, since the first and second protruding portions 16, 17 used to prevent the resonance are molded from rubber, resonance preventing parts (the first and second protruding portions 16, 17) can be manufactured at low cost, unlike the case where a metal part (steel ball) is used as described in the section "Description of Related Art" of the specification.

Meanwhile, when the first and second protruding portions 16, 17 are brought into contact with the right and left side surfaces of the blade 7 as in the present embodiment, there is a possibility that the natural frequency of the blade 7 may be closer to the frequency of the reciprocating slider 5, which may cause resonance between vibration of the blade 7 and vibration of the reciprocating slider 5. In this case, the resonance between vibration of the blade 7 and vibration of the reciprocating slider 5 can be avoided by, e.g., replacing the protector 15 of the present embodiment with a known protector that does not have the first and second protruding portions 16, 17 and thus cannot contact the left and right side surfaces of the blade 7.

Effects of the Embodiment

In the reciprocating saw 1 of the present embodiment, the natural frequency of the blade 7 can be changed by merely bringing the first protruding portion 16 and the second protruding portion 17 into contact with the blade 7. The frequency of the blade 7 can thus be made different from that of the reciprocating slider 5 with the blade 7 mounted thereon. Accordingly, resonance between vibration of the blade 7 and vibration of the reciprocating slider 5 can be prevented by a simple method of bringing the first and second protruding portions 16, 17 into contact with the blade 7.

When the first protruding portion 16 is brought into contact with the right side surface of the blade 7 and the second protruding portion 17 is brought into contact with the left side surface of the blade 7 as shown in FIG. 4, the first and second protruding portions 16, 17 can suppress vibration of the blade 7 in the lateral direction. This can increase the difference between the natural frequency of the blade 7 with which the first and second protruding portions 16, 17 are in contact and the frequency of the reciprocating slider 5. As a result, resonance between vibration of the blade 7 and vibration of the reciprocating slider 5 can be effectively prevented.

When the first and second protruding portions 16, 17 contact the blade 7 retained and fixed in the slit 10, the natural frequency of the blade 7 can be changed. In contrast, the first and second protruding portions 16, 17 do not contact the blade 7 that is unfixed from the slit 10, and therefore do not hinder the operation of removing the blade 7 from the slit 10.

The present invention is not limited to the above embodiment, and the configuration can be partially modified as appropriate without departing from the scope of the invention. For example, although the first and second protruding portions 16, 17 are molded integrally with the protector 15 in the above embodiment, the present invention is not limited to this, and the first and second protruding portions 16, 17 may be molded separately from the protector 15 and then attached to the protector 15. In the above embodiment, the first and second protruding portions 16, 17 are brought into contact with the both sides of the blade 7 at separate positions in the vertical direction of the blade 7. However, the present invention is not limited to this, and the first and second protruding portions 16, 17 may be brought into contact with the both sides of the blade 7, at the same position in the vertical direction. In this case as well, the difference between the natural frequency of the blade 7 and the frequency of the reciprocating slider 5 can be increased as in the above embodiment.

In the above embodiment, the first and second protruding portions 16, 17 are brought into contact with the both sides of the blade 7. However, the present invention is not limited to this, and the first protruding portion 16 or the second protruding portion 17 may be brought into contact with the left or right side of the blade 7. In this case as well, by the first protruding portion 16 or the second protruding portion 17 that is in contact with the blade 7, the natural frequency of the blade 7 can be changed to a frequency different from the case where the first protruding portion 16 or the second protruding portion 17 is not brought into contact with the blade 7.

The above embodiment is described with respect to an example in which the present invention is applied to an AC-driven reciprocating saw. However, the present invention is not limited to this, and the present invention is applicable to a rechargeable reciprocating saw in which power is supplied from a battery to a motor.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A reciprocating saw, comprising:
a housing;
a motor accommodated in the housing;
a slider configured to be driven by the motor so that the slider reciprocates relative to the housing in a longitudinal direction, the slider having a forward tip end protruding forward beyond the housing, the slider having a joining portion at the forward tip end;
a blade fixedly retrained by the joining portion such that the blade reciprocates with the slider to cut a workpiece;
a protector made of an elastic material and extending about a periphery of the joining portion, the protector being rotatable relative to the blade; and
a contact portion provided on the protector, the contact portion extending beyond the forward tip end of the slider in the longitudinal direction and being rotatable with the protector between (i) a non-contact position relative to the blade and (ii) a contact position configured to contact a surface of the blade fixedly retained by the joining portion.

2. The reciprocating saw according to claim 1, wherein the contact portion is provided on the protector so that the contact portion can contact both sides of the blade.

3. The reciprocating saw according to claim 1, wherein the contact portion contacts the blade when the blade is fixed to the joining portion, and the contact portion does not contact the blade when the blade is not fixed to the joining portion.

4. The reciprocating saw according to claim 2, wherein the contact portion is formed by (i) a first protruding portion extending from a lower right region to an upper right region of a front end face of the protector so as to protrude from the front end face, having a generally fan shape spreading from a center side toward an outer peripheral side of the front end face as viewed from front, and capable of contacting a right side of the blade, and (ii) a second protruding portion extending from an upper left region to a lower left region of the front end face so as to protrude from the front end face, having a generally fan shape spreading from the center side toward the outer peripheral side of the front end face as viewed from the front, and capable of contacting a side of the blade.

5. The reciprocating saw according to claim 4, wherein
a vertex portion of the first protruding portion is capable of contacting an upper part of the right side of the blade, and a vertex portion of the second protruding portion is capable of contacting a lower part of the left side of the blade.

6. The reciprocating saw according to claim 4, wherein
the first protruding portion and the second protruding portion are made of rubber.

\* \* \* \* \*